(12) United States Patent
Le

(10) Patent No.: US 10,833,769 B1
(45) Date of Patent: Nov. 10, 2020

(54) COHERENT OPTICAL RECEIVER USING SINGLE-ENDED PHOTODIODES

(71) Applicant: Nokia Solutions and Networks OY, Espoo (FI)

(72) Inventor: Thai Son Le, Aberdeen, NJ (US)

(73) Assignee: Nokia Solutions and Networks OY, Espoo (FI)

(*) Notice: Subject to any disclaimer, the term of this patent is extended or adjusted under 35 U.S.C. 154(b) by 0 days.

(21) Appl. No.: 16/574,378

(22) Filed: Sep. 18, 2019

(51) Int. Cl.
H04B 10/06 (2006.01)
H04B 10/61 (2013.01)
H04B 10/079 (2013.01)

(52) U.S. Cl.
CPC ....... *H04B 10/61* (2013.01); *H04B 10/07955* (2013.01)

(58) Field of Classification Search
CPC .. H04B 10/614; H04B 10/615; H04B 10/613; H04B 10/612; H04B 10/6151; H04B 10/616; H04B 10/6161; H04B 10/6165; H04B 10/69; H04B 10/6166; H04B 10/6164; H04B 10/61; H04J 14/06
USPC ....... 398/202, 203, 204, 205, 206, 207, 208, 398/209, 210, 212, 213, 214, 38, 158, 398/159, 135, 136, 183, 188, 184, 65, 398/152

See application file for complete search history.

(56) References Cited

U.S. PATENT DOCUMENTS

| 8,849,130 B2* | 9/2014 | Xie | H04B 10/616 398/202 |
| 2010/0074632 A1* | 3/2010 | Zhou | H04B 10/2513 398/208 |

(Continued)

FOREIGN PATENT DOCUMENTS

WO WO2018213251 A1 11/2018

OTHER PUBLICATIONS

Erkilinç, M. Sezer, et al. "Comparison of Low Complexity Coherent Receivers for UDWDM-PONs (λ-to-the-user)." Journal of Lightwave Technology 36.16 (2018): 3453-3464.

(Continued)

*Primary Examiner* — Hanh Phan
(74) *Attorney, Agent, or Firm* — Mendelsohn Dunleavy, P.C.; Yuri Gruzdkov

(57) ABSTRACT

A PDM-capable coherent optical receiver can be implemented using four high-bandwidth photodiodes connected in a single-ended electrical configuration. The SSBI present in the electrical output of the single-ended photodiodes is effectively canceled in the receiver DSP based on measurements of average optical power of the optical data and local-oscillator signals. In various embodiments, such measurements can be performed using relatively inexpensive circuits/components incorporated into the optical front end of the receiver. For a given signaling interval, the DSP runs an iterative algorithm to compute estimates of the in-phase and quadrature components of the optical data signal and achieve a level of performance comparable to that of a (Continued)

coherent optical receiver having a greater number of high-bandwidth photodiodes connected to form balanced photodetectors. The achieved reduction in the number of high-bandwidth photodiodes can advantageously be used, e.g., to significantly reduce the total cost of a high-speed optical transponder.

17 Claims, 7 Drawing Sheets

(56) References Cited

U.S. PATENT DOCUMENTS

| | | | |
|---|---|---|---|
| 2010/0254718 A1* | 10/2010 | Oda | H04B 10/60 398/202 |
| 2012/0213532 A1 | 8/2012 | Hironishi et al. | |
| 2016/0285561 A1 | 9/2016 | Wu et al. | |
| 2019/0173588 A1 | 6/2019 | Ahmed et al. | |

OTHER PUBLICATIONS

Ho, Keang-Po. "Phase-Modulated Optical Communication Systems." Springer Science & Business Media, United States (2005): 1-439.

Kikuchi, Kazuro. "Fundamentals of coherent optical fiber communications." Journal of Lightwave Technology 34.1 (2015): 157-179.

Painchaud, Yves, et al. "Performance of balanced detection in a coherent receiver." Optics Express 17.5 (2009): 3659-3672.

Yi, Wenting, et al. "Performance of Kramers—Kronig Receivers in the Presence of Local Oscillator Relative Intensity Noise." Journal of Lightwave Technology 37.13 (2019): 3035-3043.

Zhang, Bo et al. "Design of coherent receiver optical front end for unamplified applications." Optics express 20.3 (2012): 3225-3234.

* cited by examiner

100

300

400

500

COHERENT OPTICAL RECEIVER USING SINGLE-ENDED PHOTODIODES

BACKGROUND

Field

Various example embodiments relate to optical communication equipment and, more specifically but not exclusively, to coherent optical receivers.

Description of the Related Art

This section introduces aspects that may help facilitate a better understanding of the disclosure. Accordingly, the statements of this section are to be read in this light and are not to be understood as admissions about what is in the prior art or what is not in the prior art.

Coherent detection is used in optical communication systems, for example, because it is compatible with advanced modulation formats, such as quadrature phase-shift keying (QPSK) and quadrature-amplitude modulation (QAM), which enable the corresponding optical communication system to achieve relatively high spectral efficiency. The use of polarization division multiplexing (PDM) can increase the effective bit rate and spectral efficiency approximately by a factor of two.

SUMMARY OF SOME SPECIFIC EMBODIMENTS

A PDM-capable coherent optical receiver can be implemented using four high-bandwidth photodiodes connected in a single-ended electrical configuration. The signal-to-signal beat interference (SSBI) present in the electrical output of the single-ended photodiodes is effectively canceled in the receiver digital signal processor (DSP) based on measurements of average optical power of the optical data and local-oscillator signals. In various embodiments, such measurements can be performed using relatively inexpensive circuits/components, such as electrical-signal integrators or slow photodetectors, incorporated into the optical front end of the receiver. For a given signaling interval, the DSP runs an iterative algorithm to compute estimates of the in-phase and quadrature components of the optical data signal and achieve a level of performance comparable to that of a coherent optical receiver having a greater number of high-bandwidth photodiodes connected to form balanced photodetectors. The achieved reduction in the number of high-bandwidth photodiodes can advantageously be used, e.g., to significantly reduce the total cost of a high-speed optical transponder.

According to an example embodiment, provided is an apparatus comprising a coherent optical data receiver that comprises: an optical hybrid configured to mix an optical data signal and an optical local-oscillator signal to generate a plurality of mixed optical signals; a first photodiode electrically connected in a single-ended configuration and configured to generate a first stream of digitalizations in response to a first one of the mixed optical signals; a second photodiode electrically connected in a single-ended configuration and configured to generate a second stream of digitalizations in response to a second one of the mixed optical signals; an averaging circuit configured to generate a third stream of digitalizations providing measurements of average optical power of the optical data signal or measurements of average combined optical power of the optical data and local-oscillator signals, said average corresponding to a plurality of signaling intervals of the optical data signal; and a digital signal processor configured to generate estimates of an in-phase component and of a quadrature component of the optical data signal using said first, second, and third streams of digitalizations.

In some embodiments of the above apparatus, the digital signal processor is configured to substantially cancel signal-to-signal beat interference in the first and second streams of digitalizations using the third stream of digitalizations.

In some embodiments of any of the above apparatus, the digital signal processor is configured to remove a dc offset corresponding to average optical power of the optical local-oscillator signal from the first and second streams of digitalizations using the third stream of digitalizations.

BRIEF DESCRIPTION OF THE DRAWINGS

Other aspects, features, and benefits of various disclosed embodiments will become more fully apparent, by way of example, from the following detailed description and the accompanying drawings, in which.

DETAILED DESCRIPTION

Figure 1:
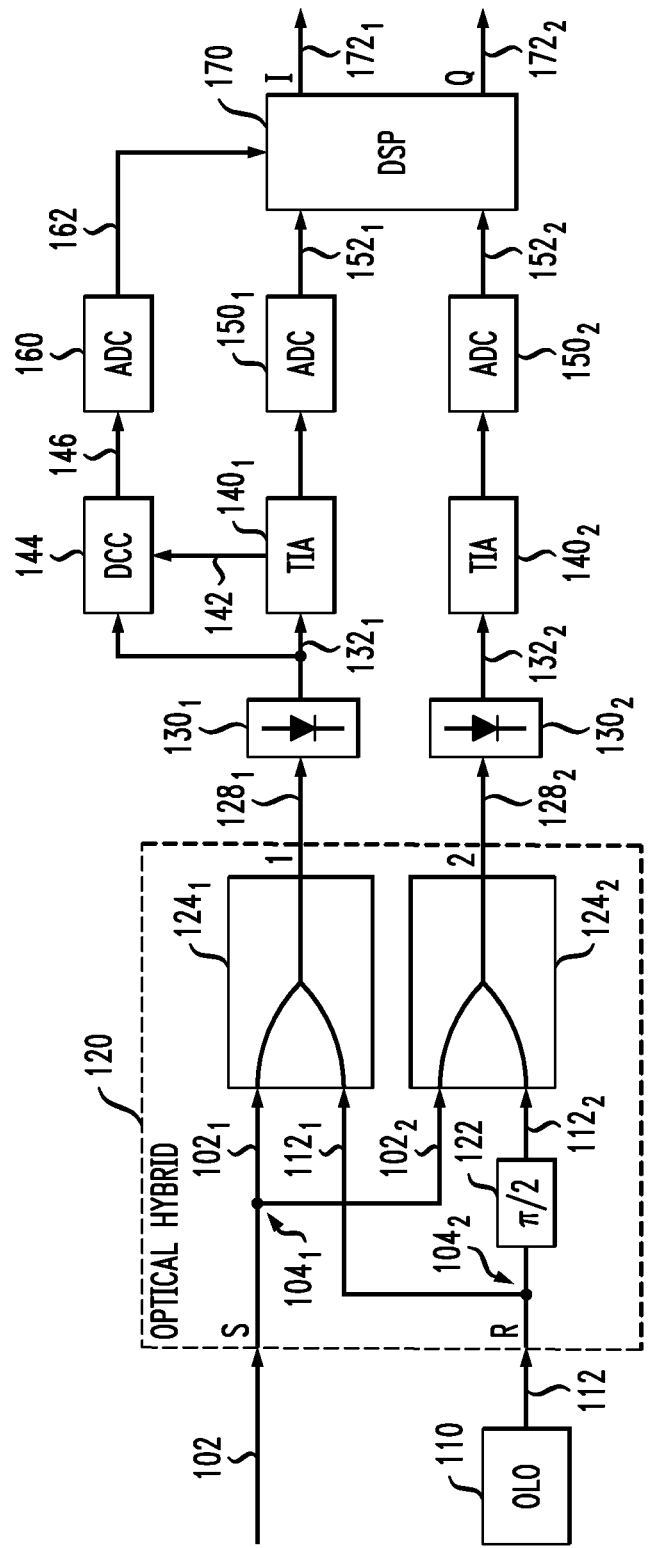
FIG. 1 shows a block diagram of a coherent optical receiver according to an embodiment.

As used herein, the term "intradyne" refers to an optical-receiver configuration in which the frequency difference between the optical local oscillator (OLO) and the received optical carrier is relatively small (e.g., within the bandwidth of the optical receiver), but does not have to be zero. These characteristics enable the use of hardware in which the frequency and phase of the OLO do not have to be actively controlled to high accuracy. Such hardware can be implemented, e.g., without the use of a phase-lock-loop (PLL).

As used herein, the term "homodyne" refers to an optical-receiver configuration in which the frequency difference between the OLO and the received optical carrier is substantially zero. In some homodyne-detection schemes, some amount of phase noise in the OLO can be tolerated, as long as the information encoded as modulation of the phase and/or frequency of the received optical carrier can be extracted with a sufficiently low bit-error rate (BER).

Some embodiments disclosed herein are compatible with either intradyne detection or homodyne detection, or with both.

A coherent optical receiver is typically constructed using a 2×4 optical hybrid and four photodiodes optically coupled to the four outputs of the optical hybrid and electrically connected to form two balanced photodetectors that detect the received light differentially. Since the individual photodiodes of a balanced photodetector are connected to the optical hybrid to receive the optical signals in which the beatings of the data signal and OLO are relatively out of phase by 180 degrees, the useful beat intensities are added by the balanced photodetector, thereby doubling the amplitude of the meaningful photocurrent. At the same time, the detrimental signal-to-signal beat interference and some noise is effectively canceled by the balanced photodetector.

A PDM-capable coherent optical receiver typically employs two 2×4 optical hybrids (one per polarization) and eight photodiodes in four balanced photodetectors optically coupled to the optical hybrids. Those photodiodes typically have a bandwidth that is sufficient for the used modulation speed. As a result, relatively expensive high-bandwidth photodiodes are typically used in high-rate (e.g., >64 Gbaud) systems. In such systems, the cost of optical hybrids and photodiodes may constitute a significant (e.g., large) portion of the total cost of the optical transponder.

This and possibly some other problems in the state of the art can be addressed using at least some embodiments disclosed herein. For example, according to one example embodiment, a PDM-capable coherent optical receiver can be implemented using two 2×2 optical hybrids (one per polarization) and only four high-bandwidth photodiodes, each connected in a single-ended electrical configuration. The signal-to-signal beat interference present in the output of the single-ended photodiodes is effectively canceled using relatively inexpensive circuits incorporated into the optical front end of the receiver and/or using disclosed signal-processing methods implemented in the receiver DSP, e.g., as explained in more detail below. The resulting 2-fold reduction in the number of high-bandwidth photodiodes can advantageously be used, e.g., to significantly reduce the total cost of the optical transponder.

FIG. 1 shows a block diagram of a coherent optical receiver 100 according to an embodiment. Receiver 100 is configured to receive a data-modulated optical signal 102, e.g., from a remote transmitter, via an optical communication link (e.g., a fiber-optic link, not explicitly shown in FIG. 1). Optical signal 102 is applied to a first input port, labeled S, of a 2×2 optical hybrid 120. A second input port, labeled R, of optical hybrid 120 is connected to receive an OLO signal 112 generated by an OLO source (e.g., laser) 110.

In some embodiments, OLO signal 112 can be phase and frequency locked to the optical carrier of optical signal 102, e.g., as known in the pertinent art. In such embodiments, receiver 100 can operate as a homodyne optical receiver.

In some embodiments, OLO signal 112 and the optical carrier of optical signal 102 may have a small frequency difference between them. In such embodiments, receiver 100 can operate as an intradyne optical receiver.

In operation, optical hybrid 120 mixes optical signal 102 and OLO signal 112 to generate mixed optical signals $128_1$ and $128_2$ at first and second output ports thereof, labeled 1 and 2, respectively. In an example embodiment of optical hybrid 120, each of signals 102 and 112 is split into two portions using a respective one of 3-dB power splitters $104_1$ and $104_2$. A relative phase shift of about 90 degrees ($\pi/2$ radian) is then applied to one portion, labeled $112_2$, of OLO signal 112 using a phase shifter 122. The signal portions $102_1$ and $112_1$ are optically mixed with one another using a 2×1 optical signal mixer (e.g., optical coupler) $124_1$ to generate optical signal $128_1$. The signal portions $102_2$ and $112_2$ are similarly optically mixed with one another using a 2×1 optical signal mixer $124_2$ to generate optical signal $128_2$.

Optical signals $128_1$ and $128_2$ are detected by photodiodes $130_1$ and $130_2$, respectively, that convert those optical signals into the corresponding electrical signals, labeled $132_1$ and $132_2$, respectively. Note that each of photodiodes $130_1$ and $130_2$ is connected in a single-ended electrical configuration.

As used herein, the term "single-ended" refers to an electrical configuration in which the photocurrent generated by a single photodiode is being sensed and/or measured by the corresponding electrical circuit (e.g., a transimpedance amplifier) connected to the photodiode. The single photodiode so connected has a single optical input, a single electrical output, and a p-n junction that converts light received at the optical input into electrical current at the electrical output.

A single-ended electrical configuration should be contrasted with a balanced or differential electrical configuration in which the photocurrents generated by two serially connected photodiodes are driven through a common electrical terminal, and the combined photocurrent flowing through the common electrical terminal is sensed and/or measured by the corresponding electrical circuit connected thereto. A typical balanced photodetector has two optical inputs, one electrical output, and two nominally identical constituent photodiodes having separate and distinct p-n junctions. The quality of a balanced photodetector so constructed typically depends on the extent to which the two constituent photodiodes are matched to one another.

Each of electrical signals $132_1$ and $132_2$ is amplified using a corresponding one of amplifiers $140_1$ and $140_2$ coupled to analog-to-digital converters (ADCs) $150_1$ and $150_2$, respectively. Each of ADCs $150_1$ and $150_2$ samples the output of the corresponding one of amplifiers $140_1$ and $140_2$ at an appropriate sampling rate and sampling phase(s) to produce digital samples for a corresponding one of digital signals $152_1$ and $152_2$.

In some embodiments, each of amplifiers $140_1$ and $140_2$ can be a transimpedance amplifier (TIA), as indicated in FIG. 1.

A copy of electrical signal $132_1$ is also applied to a direct-current (dc) converter (DCC) 144 configured to convert a radio-frequency (RF) input into a corresponding dc output. As such, DCC 144 converts electrical signal $132_1$, which is typically RF-modulated, into a quasi-dc electrical signal 146. The prefix "quasi" indicates that electrical signal 146 may not be constant in time, but might slowly change, e.g., on the time scale that is much longer than the reciprocal baud rate of modulated optical signal 102. Such change may typically be caused by the corresponding slow changes (e.g., drift) in certain characteristics of one or both of optical signals 102 and 112.

In an example embodiment, DCC 144 may be configured to convert electrical signal $132_1$ into electrical signal 146 using the following example signal-processing steps: (A) averaging electrical signal $132_1$ over a fixed, relatively large number of signaling intervals (time slots); and (B) multiplying the resulting average value by a fixed scaling factor. Step (A) can be implemented, e.g., using a low pass filter or an electrical-signal integrator. Step (B) can be implemented, e.g., using an amplifier configured to amplify the average current (or voltage) generated by the low pass filter or integrator. The amplifier gain (scaling factor) used at step (B) is set to be the same as the gain of amplifier $140_1$, which is communicated to DCC 144 by way of an appropriate control signal 142.

An ADC 160 then converts electrical signal 146 generated by DCC 144 into digital form, thereby generating a digital signal 162. In an example embodiment, ADC 160 may differ from ADCs $150_1$ and $150_2$ in that the sampling rate of ADC 160 can be much lower than the sampling rate of ADCs $150_1$ and $150_2$.

Digital signals $152_1$, $152_2$, and 162 are applied to a digital signal processor (DSP) 170 that can process those signals, e.g., as explained below in reference to FIG. 2 and Eqs. (1)-(12), to generate, for each signaling interval, an estimate of the in-phase component, I, and an estimate of the quadrature component, Q, of optical signal 102. The streams of the I and Q estimates are carried by digital signals $172_1$ and $172_2$, respectively, further downstream in the DSP chain of receiver 100, where conventional signal-processing methods can be applied thereto to recover the data encoded onto optical signal 102 at the remote optical transmitter.

The following simplified mathematical model is presented to better explain the signal processing implemented in DSP 170 according to an embodiment. An example of such processing is described in reference to FIG. 2.

Suppose that the electric field $E_S$ of data-modulated optical signal 102 can be expressed as a complex value:

$$E_S = I_S + jQ_S \quad (1)$$

where $I_S$ is the in-phase component of $E_S$; and $Q_S$ is the quadrature component of $E_S$. Further suppose that the electric field $E_{LO}$ of OLO signal 112 can be expressed as a real value as follows:

$$E_{LO} = A \quad (2)$$

Eqs. (1) and (2) imply that $E_S$ is expressed relative to the OLO frequency and that the varying amplitude of $E_S$ accounts for a possible small carrier-frequency difference between optical signals 102 and 112. Eq. (2) also implies that OLO signal 112 has a negligibly low level of phase noise and a negligibly low level of relative amplitude noise.

The transfer function H of optical hybrid 120 can be approximated by the following 2×2 matrix:

$$H = \frac{1}{2}\begin{bmatrix} 1 & 1 \\ 1 & j \end{bmatrix} \quad (3)$$

For simplicity, the common factor 0.5 present in Eq. (3) is omitted in the analysis that follows.

Using Eqs. (1)-(3), optical signals $128_1$ and $128_2$ can be approximated as follows:

$$S_1 = E_S + A \quad (4a)$$

$$S_2 = E_S + jA \quad (4b)$$

where $S_1$ represents the electric field of optical signal $128_1$; and $S_2$ represents the electric field of optical signal $128_2$.

Using Eqs. (1), (2), and (4), electrical signals $132_1$ and $132_2$ can be approximated as follows:

$$P_1 = |E_S|^2 + 2AI_S + A^2 \quad (5a)$$

$$P_2 = |E_S|^2 + 2AQ_S + A^2 \quad (5b)$$

where $P_1$ represents electrical signal $132_1$; and $P_2$ represents electrical signal $132_2$. A person of ordinary skill in the art will understand that the term $|E_S|^2$ in Eqs. (5a)-(5b) represents the unwanted signal-to-signal beat interference, and the term $A^2$ represents the dc offset caused by the OLO.

Using Eq. (5a), electrical signal 146 can be approximated as follows:

$$B = M + A^2 \quad (6)$$

where B represents electrical signal 146; $M = \langle |E_Z|^2 \rangle$; and $\langle \cdot \rangle$ denotes the averaging operation. Eq. (6) is obtained from Eq. (5a) using the following property of QPSK and typical QAM constellations: $\langle I_S \rangle = \langle Q_S \rangle = \langle I_S Q_S \rangle = 0$. Eq. (6) also assumes, for simplicity, that the signal gain imposed by DCC 144 is equal to one.

Digital signals $152_1$, $152_2$, and 162 provide to DSP 170 the digital values representing the quantities expressed by Eqs. (5a), (5b), and (6), respectively.

Figure 2:
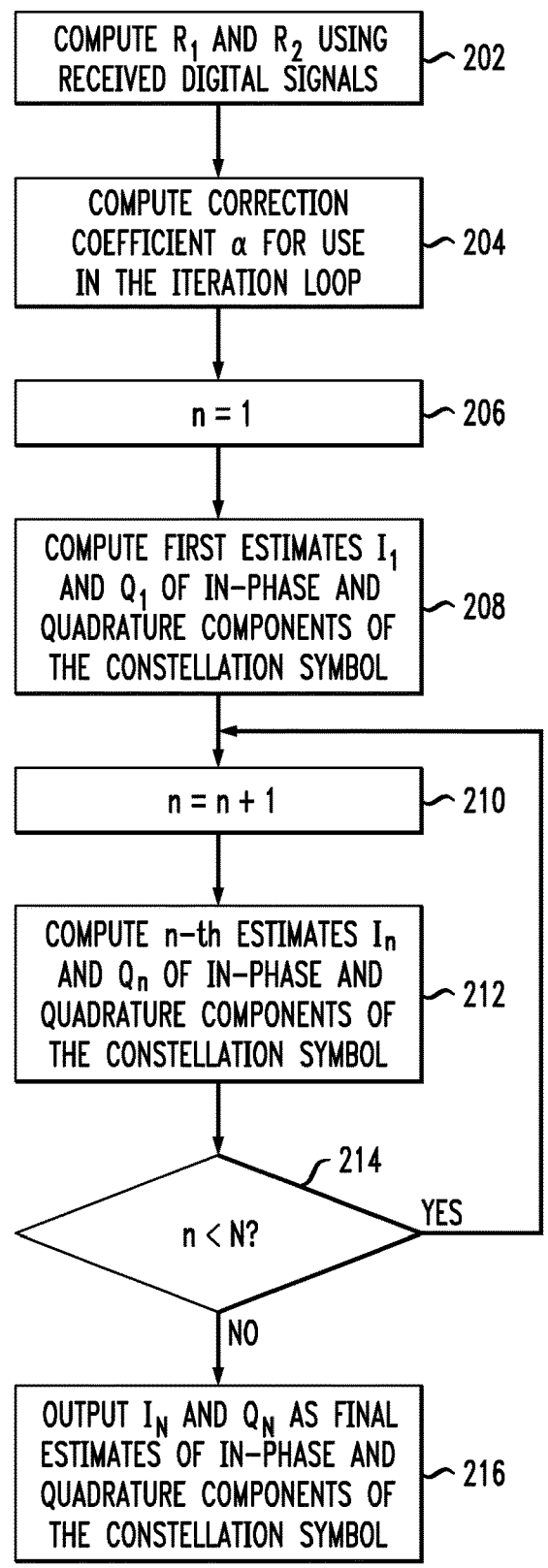
FIG. 2 shows a flowchart of a processing method that can be implemented in the coherent optical receiver of FIG. 1 according to an embodiment.

FIG. 2 shows a flowchart of a processing method 200 that can be implemented in DSP 170 (FIG. 1) according to an embodiment. Method 200 provides an example numerical algorithm that can be used to approximately reconstruct the streams of in-phase and quadrature components of the transmitted constellation symbols for digital output signals $172_1$ and $172_2$ using the streams of $P_1$, $P_2$, and B values provided by digital signals $152_1$, $152_2$, and 162. Based on the provided description, a person of ordinary skill in the art will be able to construct, without any undue experimentation, alternative algorithms suitable for the same purpose.

At step 202 of method 200, DSP 170 operates to compute, for a given (e.g., k-th) time slot, the $R_1$ and $R_2$ values based on the corresponding values of $P_1$, $P_2$, and B provided by digital signals $152_1$, $152_2$, and 162, respectively. Herein, $R_1$ and $R_2$ are defined as follows:

$$R_1 = P_1 - B \quad (7a)$$

$$R_2 = P_2 - B \quad (7b)$$

The subtraction of B from $P_1$ and $P_2$ substantially cancels the average signal-to-signal beat interference and substantially removes the dc offset caused by the OLO from the digital values provided by digital signals $152_1$ and $152_2$.

At step 204, DSP 170 operates to compute a correction coefficient $\alpha$ defined by Eq. (8) as follows:

$$\alpha = \frac{1}{2\left(B + \sqrt{B^2 - \langle (R_1 - R_2)^2 \rangle}\right)} \quad (8)$$

In an example embodiment, the average $\langle (R_1 - R_2)^2 \rangle$ used in Eq. (8) can be computed using a sliding window. For example, for the k-th time slot, the average $\langle (R_1 - R_2)^2 \rangle$ can be computed by averaging the values of $(R_1 - R_2)^2$ corresponding to the time slots (k−K), (k−K+1), (k−K+2), . . . , (k+K), where K is a relatively large, fixed positive integer. The value of K is an algorithm parameter that can be selected, e.g., for optimal performance.

Steps 206-214 of method 200 implement an iterative algorithm for computing estimates of the in-phase and quadrature components of the received optical signal. These estimates can then be used, e.g., to recover the corresponding transmitted constellation symbol. The algorithm uses the correction coefficient $\alpha$ computed at step 204 as indicated by Eqs. (9)-(10).

At step 206, the iteration index n is set to n=1.

At step 208, the initial estimates, denoted as $I_1$ and $Q_1$, of the in-phase and quadrature components of the constellation symbol transmitted in the k-th time slot are computed as follows:

$$I_1 = R_1 - \alpha(R_1^2 + R_2^2) \quad (9a)$$

$$Q_1 = R_2 - \alpha(R_1^2 + R_2^2) \quad (9b)$$

At step 210, the iteration index n is incremented by one, i.e., n=n+1.

At step 212, the n-th estimates, denoted as $I_n$ and $Q_n$, of the in-phase and quadrature components of the constellation symbol transmitted in the k-th time slot are computed using the following recursive formulas:

$$I_n = R_1 - \alpha(I_{n-1}^2 + Q_{n-1}^2) \quad (10a)$$

$$Q_n = R_2 - \alpha(I_{n-1}^2 + Q_{n-1}^2) \quad (10b)$$

Step 214 controls the exit from the iteration loop 210-214 by comparing the present value of the iteration index n with the maximum allowed value N, where the number N is a fixed positive integer. The number N is an algorithm parameter that can be selected, e.g., for optimal performance. Computer simulations show that, for most practical systems, the number N from the range bounded by 2 and 10 is suitable for obtaining sufficiently accurate final estimates of the in-phase and quadrature components of the transmitted constellation symbol (also see FIG. 6).

If the present value of the iteration index n is smaller than N, then the processing of method 200 is directed back to step 210. Otherwise, the processing of method 200 is directed to step 216.

At step 216, the following values are provided for digital signals 172$_1$ and 172$_2$:

$$I_S = I_N \quad (11a)$$

$$Q_S = Q_N \quad (11b)$$

The corresponding final estimate of the transmitted constellation symbol can therefore be expressed as:

$$E_S = I_N + jQ_N \quad (12)$$

(also see Eq. (1)).

A person of ordinary skill in the art will understand that method 200 can be repeated as appropriate or necessary for estimating the constellation symbols transmitted in other time slots.

Figure 3:
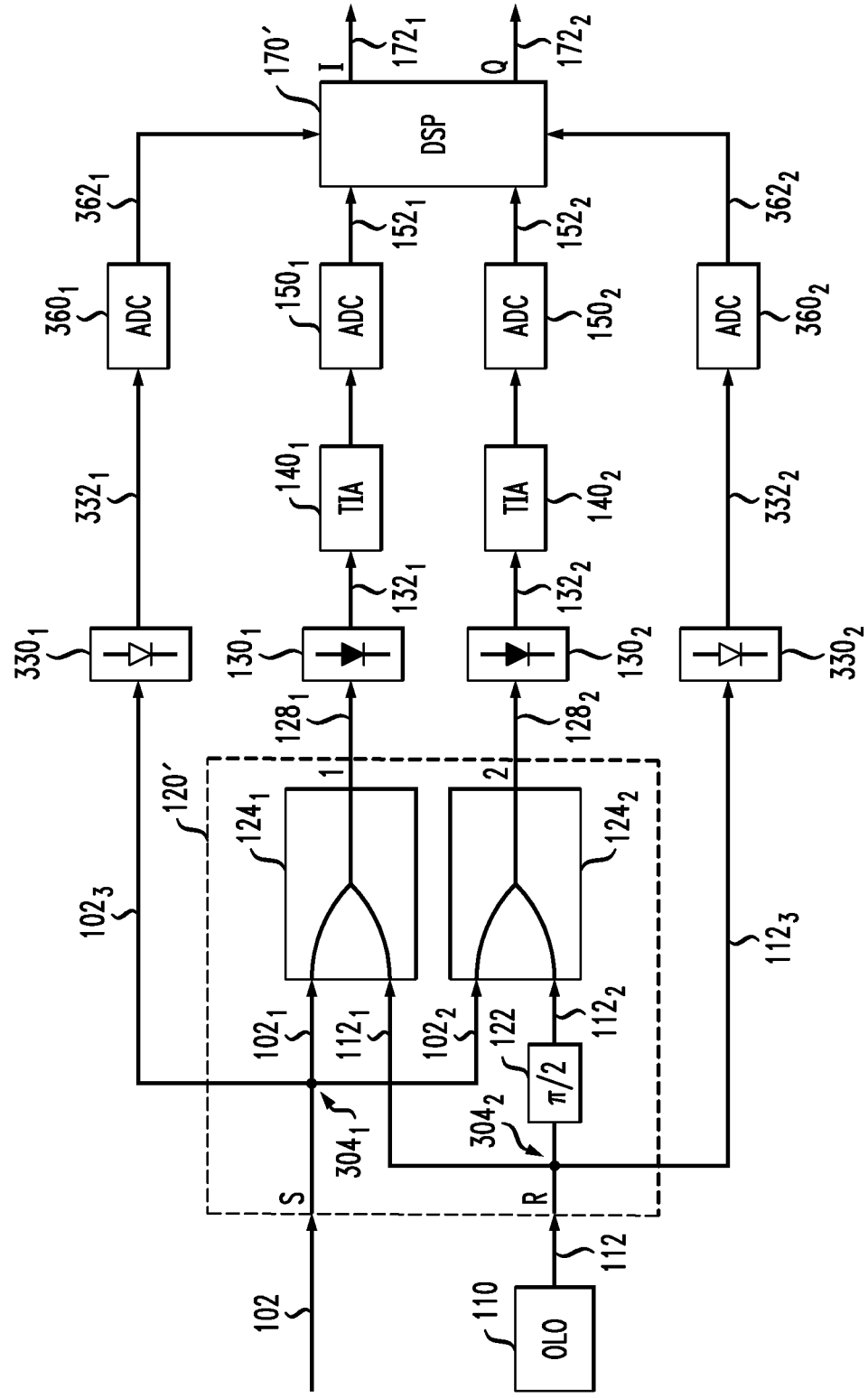
FIG. 3 shows a block diagram of a coherent optical receiver according to another embodiment.

FIG. 3 shows a block diagram of a coherent optical receiver 300 according to another embodiment. Receiver 300 is constructed using many of the same elements as receiver 100, which elements are labeled in FIG. 3 using the same numerical labels. The description of these elements is not repeated here. Instead, the description of receiver 300 primarily focuses on the differences between the two receivers.

Receiver 300 comprises a slightly modified optical hybrid 120, which is labeled in FIG. 3 as 120'. More specifically, the 3-dB power splitters 104$_1$ and 104$_2$ used in the optical hybrid 120 of FIG. 1 are replaced in optical hybrid 120' by 3-way power splitters 304$_1$ and 304$_2$, respectively.

Splitter 304$_1$ operates to split optical signal 102 into three portions, labeled 102$_1$, 102$_2$, and 102$_3$, respectively. In an example embodiment, portion 102$_3$ can be relatively small, e.g., less than 10% of the power of optical signal 102. Portions 102$_1$ and 102$_2$ receive the remainder of the power of optical signal 102 (minus the insertion loss) and have approximately equal optical powers.

Splitter 304$_2$ similarly operates to split OLO signal 112 into three portions, labeled 112$_1$, 112$_2$, and 112$_3$, respectively. In an example embodiment, splitter 304$_2$ may produce substantially the same relative power ratios for portions 112$_3$, 112$_2$, and 112$_3$ as those produced by splitter 304$_2$ for portions 102$_1$, 102$_2$, and 102$_3$.

DCC 144 and ADC 160 are not present in receiver 300 (also see FIG. 1).

Rather, receiver 300 has additional photodetectors 330$_1$ and 330$_2$ connected to ADCs 360$_1$ and 360$_2$, respectively. Photodetector 330$_1$ is connected to detect signal portion 102$_3$. A digital form of an electrical output signal 332$_1$ generated by photodetector 330$_1$ in response to signal portion 102$_3$ is provided to DSP 170' as a digital signal 362$_3$. Photodetector 330$_2$ is connected to detect signal portion 112$_3$. A digital form of the electrical output signal 332$_2$ generated by photodetector 330$_2$ in response to signal portion 112$_3$ is provided to DSP 170' as a digital signal 362$_2$.

DSP 170' differs from DSP 170 in that DSP 170' receives digital signals 362$_1$ and 362$_2$ instead of digital signal 160 (also see FIG. 1).

In an example embodiment, photodetectors 330$_1$ and 330$_2$ can be much slower (have a much lower bandwidth) than the high-bandwidth photodiodes 130$_1$ and 130$_2$. As such, photodetectors 330$_1$ and 330$_2$ may act as low-pass filters or signal integrators. For example, the bandwidth of photodetector 330$_1$ can be such that electrical output signal 332$_3$ is proportional to the average optical power of signal portion 102$_3$. Similarly, the bandwidth of photodetector 330$_2$ can be such that electrical output signal 332$_2$ is proportional to the average optical power of signal portion 112$_3$. Each of ADCs 360$_1$ and 360$_2$ can be a relatively slow ADC, e.g., similar to ADC 160 (FIG. 1).

In an example embodiment, a photodiode 130 may have an electrical bandwidth that is greater than about 50% of the symbol rate. As such, in a communication system that uses a symbol rate of 60 Gbaud, a photodiode 130 may have an electrical bandwidth of about 30 GHz. In contrast, a photodetector 330 may have an electrical bandwidth that is smaller than about 1% of the symbol rate. As such, in a communication system that uses a symbol rate of 60 Gbaud, a photodetector 330 may have an electrical bandwidth of about 600 MHz.

DSP 170' further differs from DSP 170 in that DSP 170' uses a modified processing algorithm that is compatible with the above-described features of the optical front end of receiver 300.

For example, a person of ordinary skill in the art will understand that digital signal 362$_1$ is proportional to M. Therefore, a value of M can be obtained by multiplying a digital value carried by digital signal 362$_1$ by an appropriate scaling factor. A person of ordinary skill in the art will also understand that digital signal 362$_2$ is proportional to $A^2$. Therefore, a value of $A^2$ can be obtained by multiplying a digital value carried by digital signal 362$_2$ by another appropriate scaling factor. The scaling factors can be determined, e.g., through calibration.

An example embodiment of the modified processing algorithm for DSP 170' can be constructed by adding an additional processing step to method 200 (FIG. 2), with said additional processing step being executed before step 202. During said additional processing step, the value of B can be computed by calculating a sum of (i) the value of M determined from digital signal 362$_1$ and (ii) the value of $A^2$ determined from digital signal 362$_2$. The value of B computed in this manner can then be used at steps 202 and 204 instead of the value of B previously obtained from digital signal 162 (see FIGS. 1 and 2).

Further modification of the processing algorithm may include replacing Eq. (8) used at step 204 of method 200 by Eq. (13):

$$\alpha = \frac{\sqrt{M}}{2\sqrt{A^2 \langle (R_1 - R_2)^2 \rangle}} \quad (13)$$

In some embodiments, the correction coefficient α can be determined directly from digital signal 362$_2$ as follows:

$$\alpha = \frac{1}{4A^2} \quad (14)$$

However, the use of Eq. (14) instead of Eq. (8) or Eq. (13) may require the use of significantly more-stringent calibration procedures.

Figure 4:
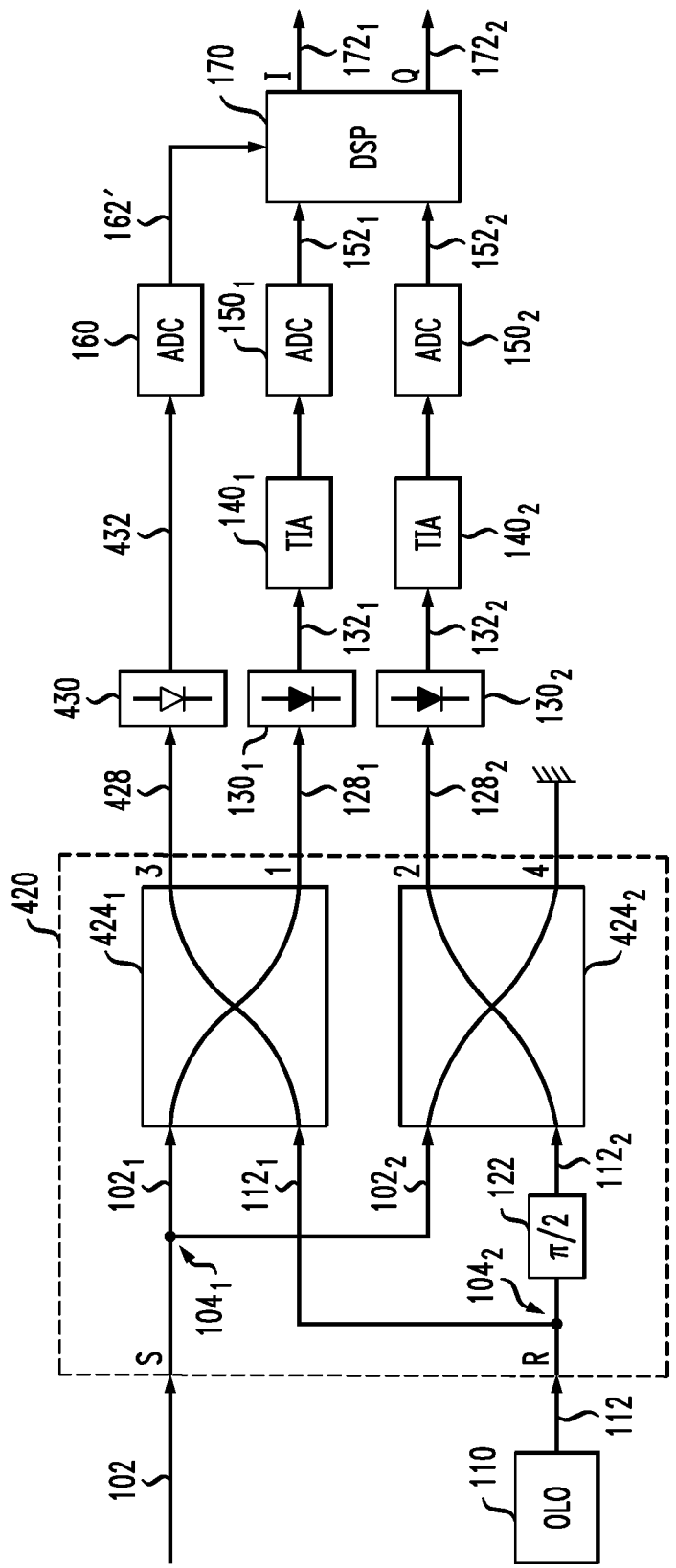
FIG. 4 shows a block diagram of a coherent optical receiver according to yet another embodiment.

FIG. 4 shows a block diagram of a coherent optical receiver 400 according to yet another embodiment. Receiver 400 is constructed using many of the same elements as receiver 100, which elements are labeled in FIG. 4 using the same numerical labels. The description of these elements is not repeated here. Instead, the description of receiver 400 primarily focuses on the differences between the two receivers.

Receiver 400 comprises an optical hybrid 420. Optical hybrid 420 differs from optical hybrid 120 in that optical hybrid 420 uses 2×2 optical signal mixers (e.g., optical couplers) 424$_1$ and 424$_2$ instead of the 2×1 optical signal mixers 124$_1$ and 124$_2$, respectively, used in optical hybrid 120 (also see FIG. 1). As such, optical hybrid 420 is a 2×4 optical hybrid. The four output ports of optical hybrid 420 are labeled in FIG. 4 using the reference numerals 1-4. Output ports 1 and 2 of optical hybrid 420 are analogous to output ports 1 and 2, respectively, of optical hybrid 120. As a result, Eqs. (4a) and (4b) remain valid for the qualitative description of mixed optical signals 128$_1$ and 128$_2$ generated by optical hybrid 420 at those two output ports thereof.

A mixed optical signal 428 generated at output port 3 of optical hybrid 420 can be approximated as follows:

$$S_3 = -E_S + A \quad (15)$$

where $S_3$ represents the electric field of optical signal 428.

Output port 4 of optical hybrid 420 is not used and can be blocked, e.g., as indicated in FIG. 4.

Receiver 400 has an additional photodetector 430 that is connected to detect optical signal 428. An electrical output signal 432 generated by photodetector 430 in response to optical signal 428 is converted into digital form by ADC 160, and the resulting digital signal 162' is applied to DSP 170. In an example embodiment, photodetector 430 can be much slower (have a much lower bandwidth) than the high-bandwidth photodiodes 130$_1$ and 130$_2$. As such, photodetector 430 may act as a low-pass filter or integrator. For example, the bandwidth of photodetector 430 can be such that electrical output signal 432 is proportional to the average optical power of signal 428. In this case, electrical output signal 432 is proportional to B, which can easily be verified using Eqs. (6) and (15). Therefore, a value of B can be computed in DSP 170 by multiplying a digital value carried by digital signal 162' by an appropriate scaling factor. This scaling factor can be determined, e.g., through calibration.

After a value of B is computed in the above-indicated manner, DSP 170 can execute method 200 to produce estimates of the constellation symbols carried by optical signal 102 (see Eq. (12)).

Figure 5:
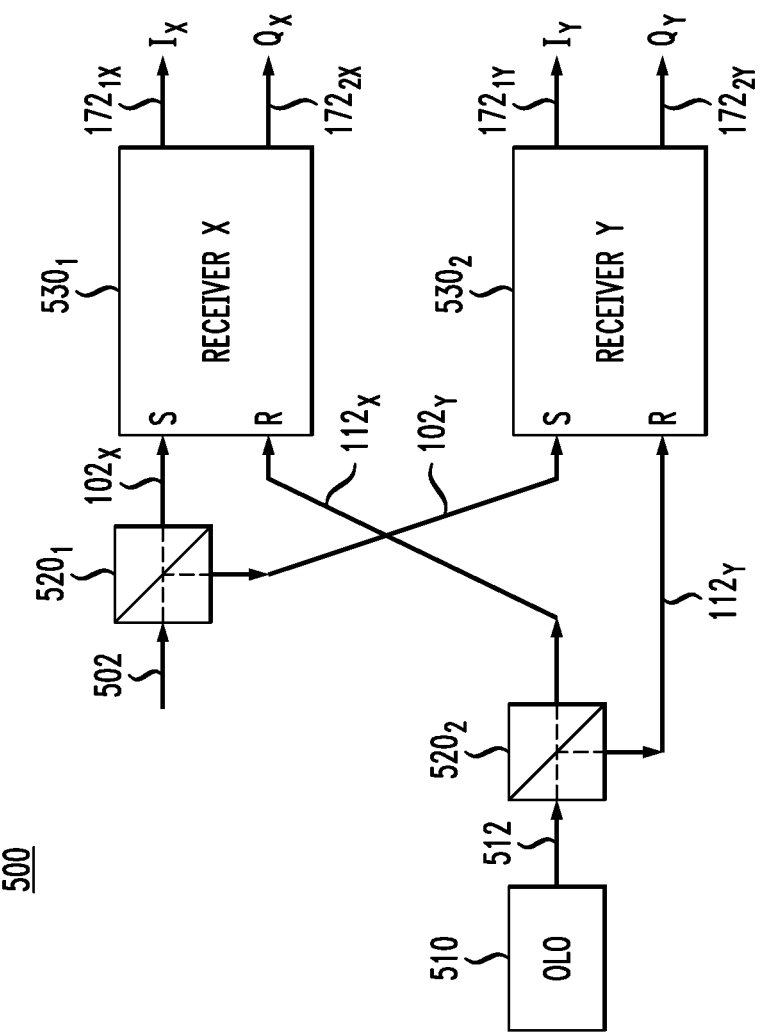
FIG. 5 shows a block diagram of a coherent optical receiver according to yet another embodiment.

FIG. 5 shows a block diagram of a coherent optical receiver 500 according to yet another embodiment. Receiver 500 is a PDM-capable receiver constructed using coherent optical receivers 530$_1$ and 530$_2$. Receiver 530$_1$ is configured to generate estimates of the constellation symbols carried by a first (e.g., X) polarization of a received optical PDM signal 502. Receiver 530$_2$ is similarly configured to generate estimates of the constellation symbols carried by a second (e.g., Y) polarization of PDM signal 502, wherein the first and second polarizations are mutually orthogonal.

Receiver 500 comprises polarization beam splitters (PBSs) 520$_1$ and 520$_2$. PBS 520$_1$ is configured to decompose PDM optical signal 502 into two orthogonal polarization components, denoted 102$_X$ and 102$_Y$. PBS 520$_2$ is similarly configured to decompose an OLO signal 512 generated by an OLO source (e.g., laser) 510 into two orthogonal polarization components, denoted 112$_X$ and 112$_Y$. Optical signals 102$_X$ and 112$_X$ are then applied to the input ports S and R, respectively, of receiver 530$_1$. Optical signals 102$y$ and 112$y$ are similarly applied to the input ports S and R, respectively, of receiver 530$_2$.

In an example embodiment, receiver 530$_1$ can be implemented using any one of receivers 100, 300, and 400, wherein OLO source 110 is removed, and input ports S and R are used as the corresponding input ports of receiver 530$_1$. In this case, the digital output signals 172$_{1X}$ and 172$_{2X}$ generated by the used one of receivers 100, 300, and 400 provide estimates of the I and Q components, respectively, of optical signal 102$_X$.

Receiver 530$_2$ can similarly be implemented using any one of receivers 100, 300, and 400, wherein OLO source 110 is removed, and input ports S and R are used as the corresponding input ports of receiver 530$_2$. The digital output signals 172$_{1Y}$ and 172$_{2Y}$ generated by the used one of receivers 100, 300, and 400 provide estimates of the I and Q components, respectively, of optical signal 102$_Y$.

Figure 6:
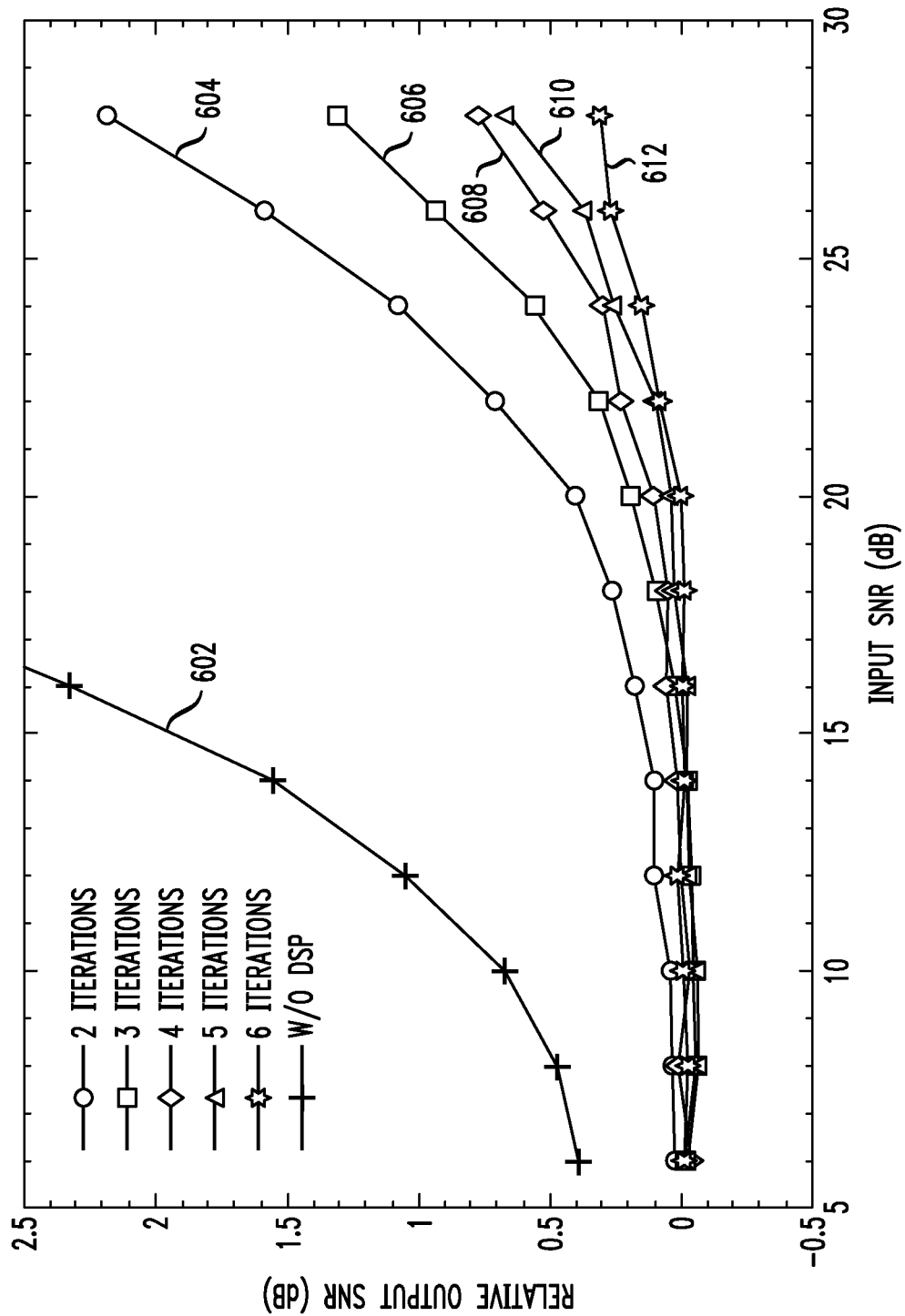
FIG. 6 graphically shows example signal-to-noise ratio (SNR) gains that can be achieved using the coherent optical receiver of FIG. 1 and processing method of FIG. 2 according to an embodiment.

FIG. 6 graphically shows example effective signal-to-noise ratio (SNR) gains that can be achieved using receiver 100 and method 200 according to an embodiment. More specifically, curves 604-612 in FIG. 6 graphically show the relative SNR of output signals 172 as a function of the SNR of optical input signal 102 for different respective values (shown in the figure legend) of the algorithm parameter N (also see step 214, FIG. 2) when the power ratio of OLO signal 112 and optical input signal 102 is fixed at 10 dB. Also shown in FIG. 6 is a curve 602 that graphically illustrates the performance of the same receiver when method 200 is not used in the receiver DSP. Significant effective SNR improvements provided by the various embodiments are thus evident from the lower relative output SNR values indicated by any one of curves 604-612 compared to those indicated by curve 602.

Figure 7:
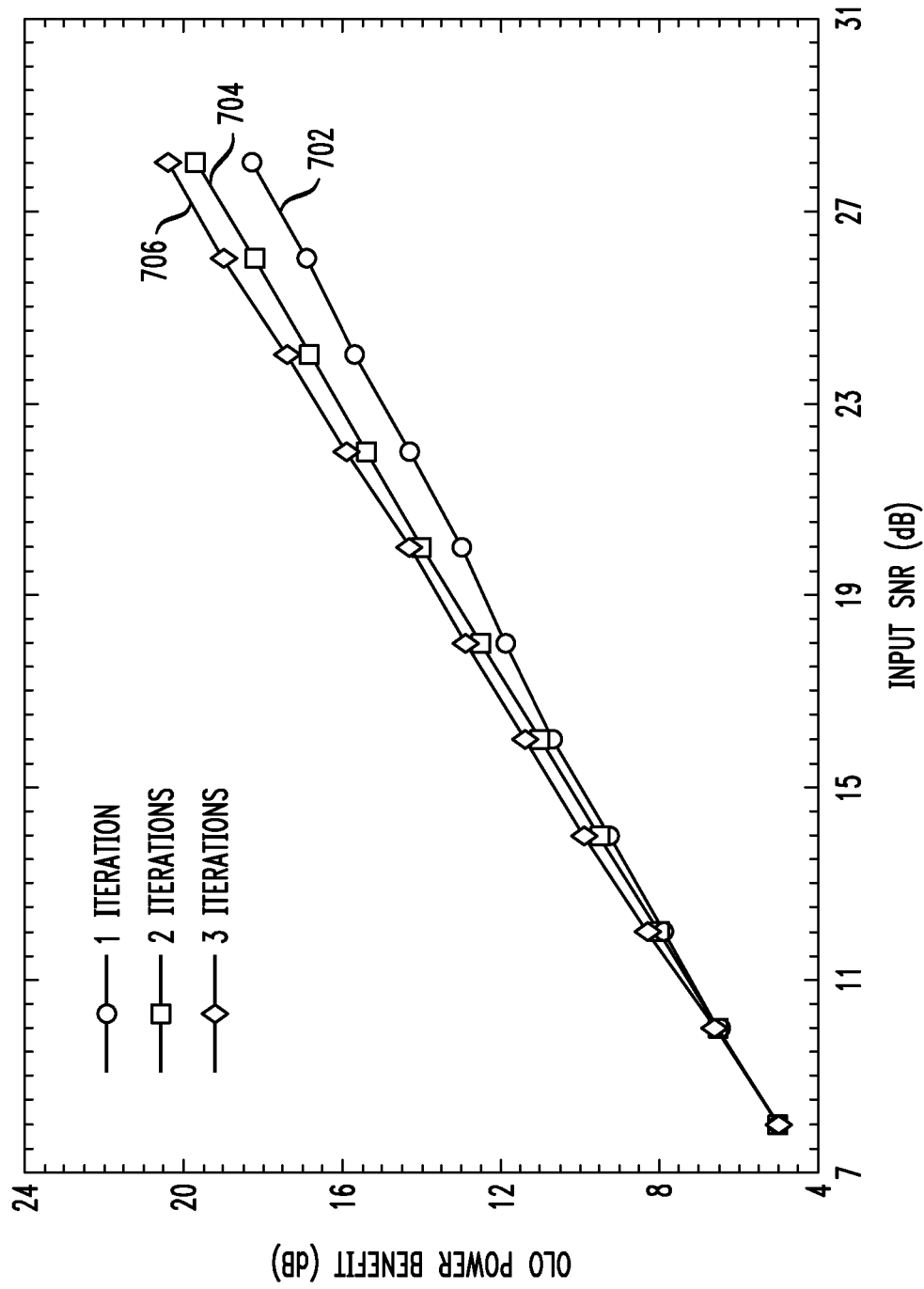
FIG. 7 graphically shows example optical local oscillator (OLO) power reduction that can be achieved in the coherent optical receiver of FIG. 1 according to an embodiment.

FIG. 7 graphically shows example OLO-power reduction that can be achieved in receiver 100 with respect to a comparable conventional receiver configured to use two single-ended photodiodes. More specifically, curves 702-706 in FIG. 7 graphically show the possible OLO-power reduction as a function of the SNR of optical input signal 102 for different respective values (shown in the figure legend) of the algorithm parameter N (also see step 214, FIG. 2). For example, curves 702-706 indicate that, at the input SNR of 15 dB, receiver 100 can provide the same output SNR as the corresponding conventional receiver while using a significantly (by about 10 dB) less powerful OLO source.

According to an example embodiment disclosed above, e.g., in the summary section and/or in reference to any one or any combination of some or all of FIGS. 1-7, provided is an apparatus comprising a coherent optical data receiver (e.g., 100, FIG. 1; 500, FIG. 5) that comprises: an optical hybrid (e.g., 120, FIG. 1; 420, FIG. 4) configured to mix an optical data signal (e.g., 102, FIG. 1) and an optical local-oscillator signal (e.g., 112, FIG. 1) to generate a plurality of mixed optical signals (e.g., 128, FIG. 1); a first photodiode (e.g., $130_1$, FIG. 1) electrically connected in a single-ended configuration and configured to generate a first stream of digitalizations (e.g., $152_1$, FIG. 1) in response to a first one of the mixed optical signals (e.g., $128_1$, FIG. 1); a second photodiode (e.g., $130_2$, FIG. 1) electrically connected in a single-ended configuration and configured to generate a second stream of digitalizations (e.g., $152_2$, FIG. 1) in response to a second one of the mixed optical signals (e.g., $128_2$, FIG. 1); an averaging circuit (e.g., 144, FIG. 1; $330_1$, FIG. 3; 430, FIG. 4) configured to generate a third stream of digitalizations (e.g., 162, FIGS. 1, 4; $362_1$, FIG. 3) providing measurements of average optical power of the optical data signal or measurements of average combined optical power of the optical data and local-oscillator signals (e.g., measurements of M or B, Eq. (6)), said average corresponding to a plurality of signaling intervals of the optical data signal; and a digital signal processor (e.g., 170, FIG. 1) configured to generate estimates (e.g., $172_1$, $172_2$, FIG. 1) of an in-phase component and of a quadrature component of the optical data signal using said first, second, and third streams of digitalizations.

In some embodiments of the above apparatus, the digital signal processor is configured to substantially cancel signal-to-signal beat interference in the first and second streams of digitalizations using the third stream of digitalizations (e.g., based on Eqs. (7a)-(7b)).

In some embodiments of any of the above apparatus, the digital signal processor is configured to remove a dc offset corresponding to average optical power of the optical local-oscillator signal from the first and second streams of digitalizations using the third stream of digitalizations (e.g., based on Eqs. (7a)-(7b)).

In some embodiments of any of the above apparatus, the digital signal processor is configured to use an iterative algorithm (e.g., 206-214, FIG. 2) to generate the estimates of the in-phase and quadrature components for a selected signaling interval of the optical data signal.

In some embodiments of any of the above apparatus, the averaging circuit is configured to generate the third stream of digitalizations in response to a photocurrent (e.g., $132_1$, FIG. 1) generated by the first photodiode.

In some embodiments of any of the above apparatus, the averaging circuit comprises a photodetector (e.g., 430, FIG. 4) configured to generate the third stream of digitalizations (e.g., 162', FIG. 4) in response to a third one of the mixed optical signals (e.g., 428, FIG. 4).

In some embodiments of any of the above apparatus, each of the first and second photodiodes has a bandwidth that is greater than 50% of a baud rate of the optical data signal; and wherein the photodetector has a bandwidth that is smaller than 1% of the baud rate.

In some embodiments of any of the above apparatus, the apparatus further comprises an optical splitter (e.g., $304_3$, FIG. 3); and wherein the averaging circuit comprises a photodetector (e.g., $330_3$, FIG. 3) configured to generate the third stream of digitalizations (e.g., $362_3$, FIG. 3) in response to a portion (e.g., $102_3$, FIG. 3) of the optical data signal directed thereto by the optical splitter.

In some embodiments of any of the above apparatus, the apparatus further comprises another optical splitter (e.g., $304_2$, FIG. 3); wherein the averaging circuit comprises another photodetector (e.g., $330_2$, FIG. 3) configured to generate a fourth stream of digitalizations (e.g., $362_3$, FIG. 3) in response to a portion (e.g., $112_3$, FIG. 3) of the optical local-oscillator signal directed thereto by said another optical splitter; and wherein the digital signal processor (e.g., 170', FIG. 3) is further configured to generate said estimates using said fourth stream of digitalizations.

In some embodiments of any of the above apparatus, the digital signal processor is configured to substantially cancel signal-to-signal beat interference in the first and second streams of digitalizations using the third stream of digitalizations; and wherein the digital signal processor is configured to remove a dc offset (e.g., $A^2$, Eq. (6)) corresponding to average optical power of the optical local-oscillator signal from the first and second streams of digitalizations using the fourth stream of digitalizations.

In some embodiments of any of the above apparatus, the coherent optical data receiver (e.g., 500, FIG. 5) is capable of receiving polarization-division-multiplexed optical data signals (e.g., 502, FIG. 5).

In some embodiments of any of the above apparatus, the optical hybrid is a 2×2 optical hybrid (e.g., 120, FIG. 1).

In some embodiments of any of the above apparatus, the optical hybrid is a 2×4 optical hybrid (e.g., 420, FIG. 4).

In some embodiments of any of the above apparatus, the apparatus further comprises a laser (e.g., 110, FIG. 1) configured to generate the optical local-oscillator signal.

In some embodiments of any of the above apparatus, the laser is configured to generate the optical local-oscillator signal to be phase-locked and frequency-locked to an optical carrier of the optical data signal.

In some embodiments of any of the above apparatus, the averaging circuit (e.g., $330_1$, FIG. 3) is configured to generate the third stream of digitalizations to provide the measurements of the average optical power of the optical data signal.

In some embodiments of any of the above apparatus, the averaging circuit (e.g., 144, FIG. 1; 430, FIG. 4) is configured to generate the third stream of digitalizations to provide the measurements of the average combined optical power of the optical data and local-oscillator signals.

While this disclosure includes references to illustrative embodiments, this specification is not intended to be construed in a limiting sense. Various modifications of the described embodiments, as well as other embodiments within the scope of the disclosure, which are apparent to persons skilled in the art to which the disclosure pertains are deemed to lie within the principle and scope of the disclosure, e.g., as expressed in the following claims.

Unless explicitly stated otherwise, each numerical value and range should be interpreted as being approximate as if the word "about" or "approximately" preceded the value or range.

It will be further understood that various changes in the details, materials, and arrangements of the parts which have been described and illustrated in order to explain the nature of this disclosure may be made by those skilled in the art without departing from the scope of the disclosure, e.g., as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

A person of ordinary skill in the art would readily recognize that steps of various above-described methods can be performed by programmed computers. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media such as magnetic disks or tapes, hard drives, or optically readable digital data storage media. The embodiments are also intended to cover computers programmed to perform said steps of methods described herein.

The description and drawings merely illustrate the principles of the disclosure. It will thus be appreciated that those of ordinary skill in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions. Moreover, all statements herein reciting principles, aspects, and embodiments of the disclosure, as well as specific examples thereof, are intended to encompass equivalents thereof.

The functions of the various elements shown in the figures, including any functional blocks labeled as "processors" and/or "controllers," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

As used in this application, the term "circuitry" may refer to one or more or all of the following: (a) hardware-only circuit implementations (such as implementations in only analog and/or digital circuitry); (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation." This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. An apparatus comprising a coherent optical data receiver that comprises:
    an optical hybrid configured to mix an optical data signal and an optical local-oscillator signal to generate a plurality of mixed optical signals;

a first photodiode electrically connected in a single-ended configuration and configured to generate a first stream of digitalizations in response to a first one of the mixed optical signals;

a second photodiode electrically connected in a single-ended configuration and configured to generate a second stream of digitalizations in response to a second one of the mixed optical signals;

an averaging circuit configured to generate a third stream of digitalizations providing measurements of average optical power of the optical data signal or measurements of average combined optical power of the optical data and local-oscillator signals, said average corresponding to a plurality of signaling intervals of the optical data signal; and a digital signal processor configured to generate estimates of an in-phase component and of a quadrature component of the optical data signal using said first, second, and third streams of digitalizations; and wherein the digital signal processor is configured to remove a dc offset corresponding to average optical power of the optical local-oscillator signal from the first and second streams of digitalizations using the third stream of digitalizations.

2. The apparatus of claim 1, wherein the digital signal processor is configured to substantially cancel signal-to-signal beat interference in the first and second streams of digitalizations using the third stream of digitalizations.

3. The apparatus of claim 2, wherein the digital signal processor is configured to use an iterative algorithm to generate the estimates of the in-phase and quadrature components for a selected signaling interval of the optical data signal.

4. The apparatus of claim 1, wherein the averaging circuit is configured to generate the third stream of digitalizations in response to a photocurrent generated by the first photodiode.

5. The apparatus of claim 1, wherein the averaging circuit comprises a photodetector configured to generate the third stream of digitalizations in response to a third one of the mixed optical signals.

6. The apparatus of claim 5,
wherein each of the first and second photodiodes has a bandwidth that is greater than 50% of a baud rate of the optical data signal; and
wherein the photodetector has a bandwidth that is smaller than 1% of the baud rate.

7. The apparatus of claim 1, wherein the coherent optical data receiver is capable of receiving polarization-division-multiplexed optical data signals.

8. The apparatus of claim 1, wherein the optical hybrid is a 2×2 optical hybrid.

9. The apparatus of claim 1, wherein the optical hybrid is a 2×4 optical hybrid.

10. The apparatus of claim 1, further comprising a laser configured to generate the optical local-oscillator signal.

11. The apparatus of claim 10, wherein the laser is configured to generate the optical local-oscillator signal to be phase-locked and frequency-locked to an optical carrier of the optical data signal.

12. The apparatus of claim 1, wherein the averaging circuit is configured to generate the third stream of digitalizations to provide the measurements of the average optical power of the optical data signal.

13. The apparatus of claim 1, wherein the averaging circuit is configured to generate the third stream of digitalizations to provide the measurements of the average combined optical power of the optical data and local-oscillator signals.

14. An apparatus comprising a coherent optical data receiver that comprises:
an optical hybrid configured to mix an optical data signal and an optical local-oscillator signal to generate a plurality of mixed optical signals;
a first photodiode electrically connected in a single-ended configuration and configured to generate a first stream of digitalizations in response to a first one of the mixed optical signals;
a second photodiode electrically connected in a single-ended configuration and configured to generate a second stream of digitalizations in response to a second one of the mixed optical signals;
an averaging circuit configured to generate a third stream of digitalizations providing measurements of average combined optical power of the optical data and local-oscillator signals, said average corresponding to a plurality of signaling intervals of the optical data signal; and
a digital signal processor configured to generate estimates of an in-phase component and of a quadrature component of the optical data signal using said first, second, and third streams of digitalizations.

15. An apparatus comprising a coherent optical data receiver that comprises:
an optical hybrid configured to mix an optical data signal and an optical local-oscillator signal to generate a plurality of mixed optical signals;
a first photodiode electrically connected in a single-ended configuration and configured to generate a first stream of digitalizations in response to a first one of the mixed optical signals;
a second photodiode electrically connected in a single-ended configuration and configured to generate a second stream of digitalizations in response to a second one of the mixed optical signals;
an averaging circuit configured to generate a third stream of digitalizations providing measurements of average optical power of the optical data signal or measurements of average combined optical power of the optical data and local-oscillator signals, said average corresponding to a plurality of signaling intervals of the optical data signal; and
a digital signal processor configured to generate estimates of an in-phase component and of a quadrature component of the optical data signal using said first, second, and third streams of digitalizations; and
wherein the averaging circuit is configured to generate the third stream of digitalizations in response to a photocurrent generated by the first photodiode.

16. An apparatus comprising a coherent optical data receiver that comprises:
an optical hybrid configured to mix an optical data signal and an optical local-oscillator signal to generate a plurality of mixed optical signals;
a first photodiode electrically connected in a single-ended configuration and configured to generate a first stream of digitalizations in response to a first one of the mixed optical signals;
a second photodiode electrically connected in a single-ended configuration and configured to generate a second stream of digitalizations in response to a second one of the mixed optical signals;

an averaging circuit configured to generate a third stream of digitalizations providing measurements of average optical power of the optical data signal or measurements of average combined optical power of the optical data and local-oscillator signals, said average corresponding to a plurality of signaling intervals of the optical data signal; and a digital signal processor configured to generate estimates of an in-phase component and of a quadrature component of the optical data signal using said first, second, and third streams of digitalizations;

wherein the averaging circuit comprises a photodetector configured to generate the third stream of digitalizations in response to a third one of the mixed optical signals;

wherein each of the first and second photodiodes has a bandwidth that is greater than 50% of a baud rate of the optical data signal; and wherein the photodetector has a bandwidth that is smaller than 1% of the baud rate.

17. An apparatus comprising a coherent optical data receiver that comprises:

an optical hybrid configured to mix an optical data signal and an optical local-oscillator signal to generate a plurality of mixed optical signals;

a first photodiode electrically connected in a single-ended configuration and configured to generate a first stream of digitalizations in response to a first one of the mixed optical signals;

a second photodiode electrically connected in a single-ended configuration and configured to generate a second stream of digitalizations in response to a second one of the mixed optical signals;

an averaging circuit configured to generate a third stream of digitalizations providing measurements of average optical power of the optical data signal or measurements of average combined optical power of the optical data and local-oscillator signals, said average corresponding to a plurality of signaling intervals of the optical data signal;

a digital signal processor configured to generate estimates of an in-phase component and of a quadrature component of the optical data signal using said first, second, and third streams of digitalizations and a fourth stream of digitalizations; and first and second optical splitters;

wherein the averaging circuit comprises a photodetector configured to generate the third stream of digitalizations in response to a portion of the optical data signal directed thereto by the first optical splitter;

wherein the averaging circuit comprises another photodetector configured to generate the fourth stream of digitalizations in response to a portion of the optical local-oscillator signal directed thereto by the second optical splitter;

wherein the digital signal processor is configured to substantially cancel signal-to-signal beat interference in the first and second streams of digitalizations using the third stream of digitalizations; and wherein the digital signal processor is configured to remove a dc offset corresponding to average optical power of the optical local-oscillator signal from the first and second streams of digitalizations using the fourth stream of digitalizations.

* * * * *